(12) United States Patent
Yabe

(10) Patent No.: US 11,702,297 B2
(45) Date of Patent: Jul. 18, 2023

(54) TRANSFER METHOD TO DRAG GRIP TARGET OBJECT

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventor: Yosuke Yabe, Kawasaki (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/449,322

(22) Filed: Sep. 29, 2021

(65) Prior Publication Data

US 2022/0017308 A1    Jan. 20, 2022

Related U.S. Application Data

(63) Continuation of application No. 16/794,307, filed on Feb. 19, 2020, now abandoned, which is a
(Continued)

(30) Foreign Application Priority Data

Sep. 8, 2017    (JP) .................................. 2017-173506
Aug. 24, 2018   (JP) .................................. 2018-157392

(51) Int. Cl.
*B65G 47/91*    (2006.01)
*B25J 15/06*    (2006.01)
*B65G 59/04*    (2006.01)

(52) U.S. Cl.
CPC .......... *B65G 47/91* (2013.01); *B25J 15/0616* (2013.01); *B65G 59/04* (2013.01)

(58) Field of Classification Search
CPC ....... B65G 47/91; B65G 59/04; B25J 15/0616
See application file for complete search history.

(56) References Cited

U.S. PATENT DOCUMENTS 9,498,887 B1 * 11/2016 Zevenbergen ....... B25J 15/0616
2001/0052708 A1 * 12/2001 Schmalz ................ B65G 61/00
                                                            294/65
(Continued)

FOREIGN PATENT DOCUMENTS

EP    3 144 255 A1    3/2017
JP    9-202451 A      8/1997
(Continued)

OTHER PUBLICATIONS

Extended European Search Report dated Jan. 11, 2021 in EP Application No. 18853800.3, (7 pgs).
(Continued)

*Primary Examiner* — Gerald McClain
(74) *Attorney, Agent, or Firm* — Oblon, McClelland, Maier & Neustadt, L.L.P.

(57) ABSTRACT

A method including gripping a first surface of a grip target object mounted on a mounting surface by the first grip portion; gripping a second surface crossing the first surface of the grip target object by the second grip portion; lifting the arm together with the first and second grip portions, to lift the grip target object; turning the first and second grip portions, to tilt the grip target object with respect to the mounting surface and bring the grip target object into contact with the mounting surface; maintaining the grip target object in a state of being tilted with respect to the mounting surface; and moving the arm together with the first
(Continued)

and second grip portions, to drag the grip target object on the mounting surface.

2 Claims, 6 Drawing Sheets

Related U.S. Application Data continuation of application No. PCT/JP2018/032227, filed on Aug. 30, 2018.

(56) References Cited

U.S. PATENT DOCUMENTS

| | | | |
|---|---|---|---|
| 2010/0032972 A1 | | 2/2010 | Braunschweiger et al. |
| 2010/0239408 A1 | | 9/2010 | Becker et al. |
| 2016/0137435 A1 | * | 5/2016 | Tanaka .................. B65G 65/00 414/800 |

FOREIGN PATENT DOCUMENTS

| | | |
|---|---|---|
| JP | 10-87074 A | 4/1998 |
| JP | 2015-74482 A | 4/2015 |
| JP | 2016-94280 A | 5/2016 |

OTHER PUBLICATIONS

International Search Report dated Nov. 6, 2018 in PCT/JP2018/032227 filed Aug. 30, 2018, 2 pages.

* cited by examiner

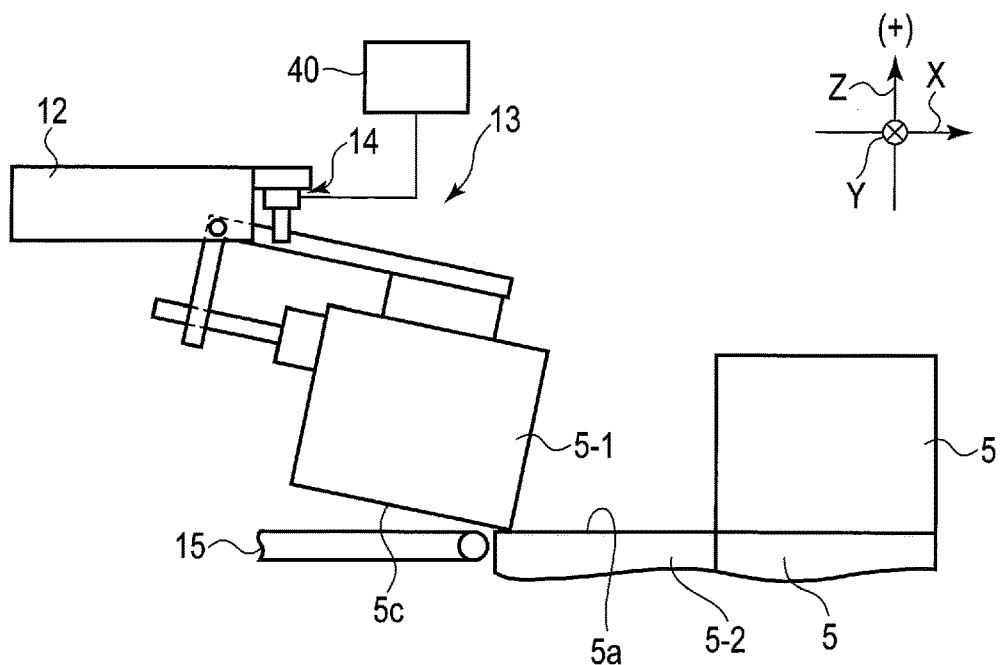
F I G. 8
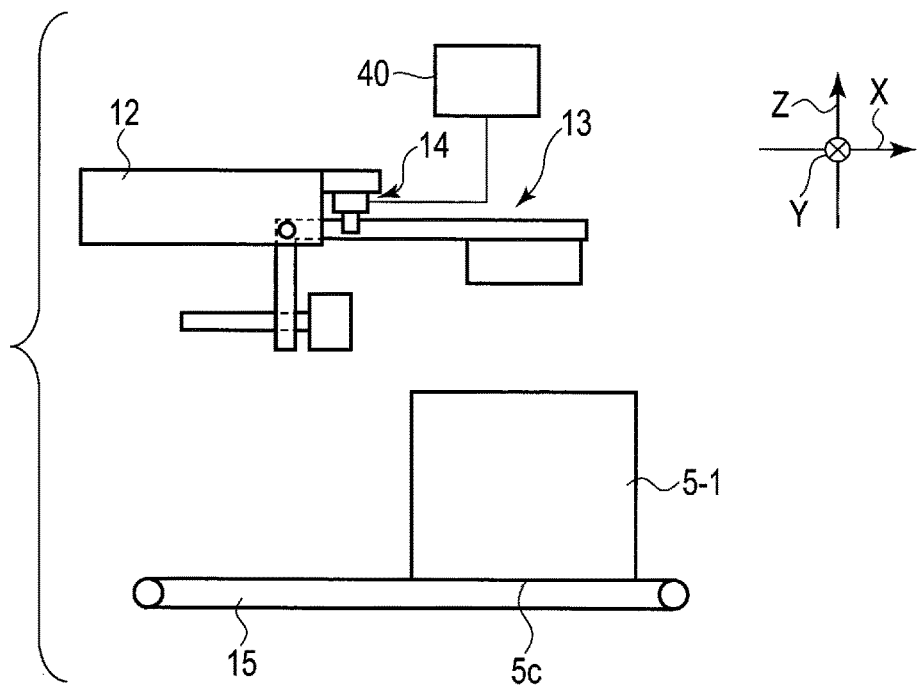
F I G. 9

TRANSFER METHOD TO DRAG GRIP TARGET OBJECT

CROSS-REFERENCE TO RELATED APPLICATIONS

This application is a Continuation Application of U.S. application Ser. No. 16/794,307, filed Feb. 19, 2020, which is a continuation of PCT Application No. PCT/JP2018/032227, filed Aug. 30, 2018 and based upon and claiming the benefit of priority from Japanese Patent Applications No. 2017-173506, filed Sep. 8, 2017; and No. 2018-157392, filed Aug. 24, 2018, the entire contents of all of which are incorporated herein by reference.

FIELD

Embodiments described herein relate generally to a transfer apparatus.

BACKGROUND

In the field of logistics, in industries where long hours of heavy work tend to be required, there is demand for automation of work from the perspective of reduction of the workload of workers, a shortage of work force, and the like. For example, there is demand for a transfer apparatus which automates unloading work which handles packed cardboard boxes.

As the technology of the transfer apparatus, a technology of transferring loaded packages one by one by sucking the upper surface of each cardboard box using a suction pad is known.

BRIEF DESCRIPTION OF THE DRAWINGS

FIG. 8 is an illustration for explaining the transfer method following FIG. 7, and is an illustration showing a state where the package is dragged to the vicinity of the movement conveyor.

FIG. 9 is an illustration for explaining the transfer method following FIG. 6 or FIG. 8, and is an illustration showing a state where the package is moved and placed on the movement conveyor.

DETAILED DESCRIPTION

Figure 1:
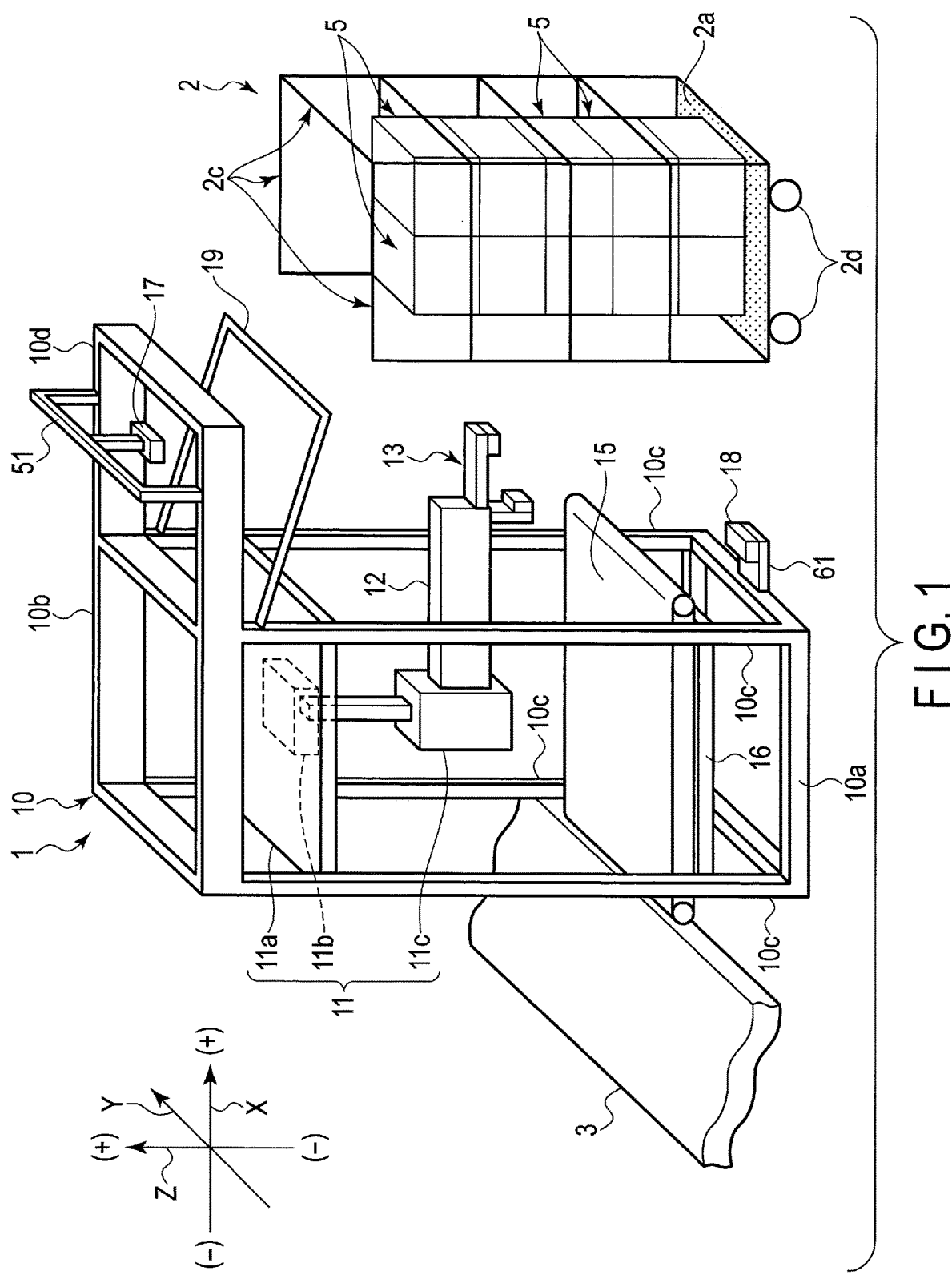
FIG. 1 is a perspective view showing a transfer apparatus according to one embodiment along with a roll-box-pallet and a transport line.

In general, according to one embodiment, a transfer apparatus includes an arm including a rotation fulcrum portion, and a grip mechanism connected to the rotation fulcrum portion and turnable around the rotation fulcrum portion. The grip mechanism includes a first grip portion which grips a first surface of a grip target object, and a second grip portion which grips a second surface crossing the first surface of the grip target object. The first grip portion has a first pad including a first grip surface which grips the first surface, and a first support member which supports the first pad. The second grip portion includes a second pad including a second grip surface which grips the second surface, and a second support member which supports the second pad, moves the second pad in a direction crossing the second grip surface, and is connected to the rotation fulcrum portion together with the first support member.

One embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by the same reference numbers, and detailed description thereof is omitted unless necessary.

FIG. 1 is a perspective view showing a transfer apparatus 1 according to one embodiment along with a roll-box-pallet 2 and a transport table 3.

As shown in FIG. 1, the transfer apparatus 1, the roll-box-pallet 2 and the transport table 3 are arranged along an X axis. The transfer apparatus 1 is an automatic unloader. The roll-box-pallet 2 is located on the front side of the transfer apparatus 1 (on the positive (+) side of the X axis of the transfer apparatus 1), and the transport table 3 is located on the rear side of the transfer apparatus 1 (on the negative (−) side of the X axis of the transfer apparatus 1).

The roll-box-pallet 2 has a bottom floor 2a, side plates 2c and wheels 2d. In this example, the side plates 2c are attached to three surfaces of the four side surfaces of the roll-box-pallet 2. The roll-box-pallet 2 is movable. The transfer apparatus 1 and the transport table 3 are arranged on the ground. The transfer apparatus 1 may be movable.

In the present embodiment, box-shaped packages 5 such as packed cardboard boxes are loaded in the roll-box-pallet 2 as grip target objects. Unlike the present embodiment, the packages 5 may be loaded not in the roll-box-pallet 2 but on flat pallets, etc.

The transfer apparatus 1 transfers the packages 5 loaded in the roll-box-pallet 2 to the transport table 3. The transfer apparatus 1 includes a housing 10, a first movement mechanism 11, an arm 12, a grip mechanism 13, a movement conveyor 15, a second movement mechanism 16, a first sensor 17, a second sensor 18, and a support bar 19.

The housing 10 has a base portion 10a, a ceiling portion 10b, pillar portions 10c, and an appentice portion 10d. Each of the base portion 10a and the ceiling portion 10b includes extension portions extending along the X axis and extension portions extending along a Y axis which is perpendicular to the X axis. The ceiling portion 10b faces the base portion 10a in a direction along a Z axis which is perpendicular to the X axis and the Y axis. The pillar portions 10c extend along the Z axis. The base portion 10a and the ceiling portion 10b are connected by the pillar portions 10c. The appentice portion 10d is connected to the ceiling portion 10b and is located on the positive (+) side of the X axis of the ceiling portion 10b.

The first movement mechanism 11 has a first linear movement portion 11a, a second linear movement portion 11b, and a connection portion 11c. The first linear movement portion 11a is supported on the housing 10 (pillar portions 10c) such that the first linear movement portion 11a is linearly movable along the Z axis. The second linear movement portion 11b is supported on the first linear movement portion 11a such that the second linear movement portion 11b is linearly movable along the Y axis. The connection portion 11c connects the second linear movement portion 11b and the arm 12.

The arm 12 is supported on the connection portion 11c and is extensible and contractible along the X axis.

The grip mechanism 13 is connected to the arm 12. The grip mechanism 13 is an end effector.

Consequently, it is possible to freely move the grip mechanism 13 by driving the first movement mechanism 11 and the arm 12. Note that the means of moving the grip mechanism 13 is not limited to the present embodiment but may be variously modified.

The movement conveyor 15 extends in a direction parallel to an X-Y plane. For example, the movement conveyor 15 can move the package 5 to the negative (−) side of the X axis, and can move the package 5 to the transport table 3.

The second movement mechanism 16 supports the movement conveyor 15. The second movement mechanism 16 is supported on the housing 10 (pillar portions 10c) such that the second movement mechanism 16 is linearly movable along the Z axis.

Consequently, it is possible to move the movement conveyor 15 along the Z axis by driving the second movement mechanism 16. Note that the means of moving the movement conveyor 15 is not limited to the present embodiment but may be variously modified.

The support bar 19 is used in a state of being hooked to the roll-box-pallet 2. As the roll-box-pallet 2 is locked by the support bar 19, the position of the roll-box-pallet 2 is fixed. Note that the support bar 19 may be used only when necessary. For example, when the position of the roll-box-pallet 2 is fixed, the wheels 2d of the roll-box-pallet 2 may be fixed by wheel clamps, etc.

The first sensor 17 is attached to the appentice portion 10d via a hold member 51. The first sensor 17 is a time-of-flight (TOF) camera which executes sensing of the lower side, in other words, the negative (−) side of the Z axis. By using the first sensor 17, it is possible to detect the location information (three-dimensional position information) of the package 5 located on the lower side of the first sensor 17 and detect the size of the upper surface of the package 5.

Note that the first sensor 17 may detect information about the package 5 from a direction different from that of the present embodiment. Alternatively, the transfer apparatus 1 can use a plurality of sensors including the first sensor 17, and information about the package 5 may be detected from a plurality of directions.

The second sensor 18 is attached to the base portion 10a via a hold member 61. The second sensor 18 is a TOF camera which executes sensing of the upper side, in other words, the positive (+) side of the Z axis. The second sensor 18 can sense the vicinity of the gap between the movement conveyor 15 and the roll-box-pallet 2.

By using the second sensor 18, it is possible to detect a collapse of packages in the roll-box-pallet 2. In addition, by using the second sensor 18, it is possible to detect the distance from the second sensor 18 to the bottom floor 2a and detect the distance from the second sensor 18 to the lower surface of the package 5 passing through the gap. The drive of the second movement mechanism 16 may be controlled on the basis of the information detected by the second sensor 18. Consequently, the height of the movement conveyor 15 can be adjusted to the package 5.

The above is the general configuration of the transfer apparatus 1.

Figure 2:
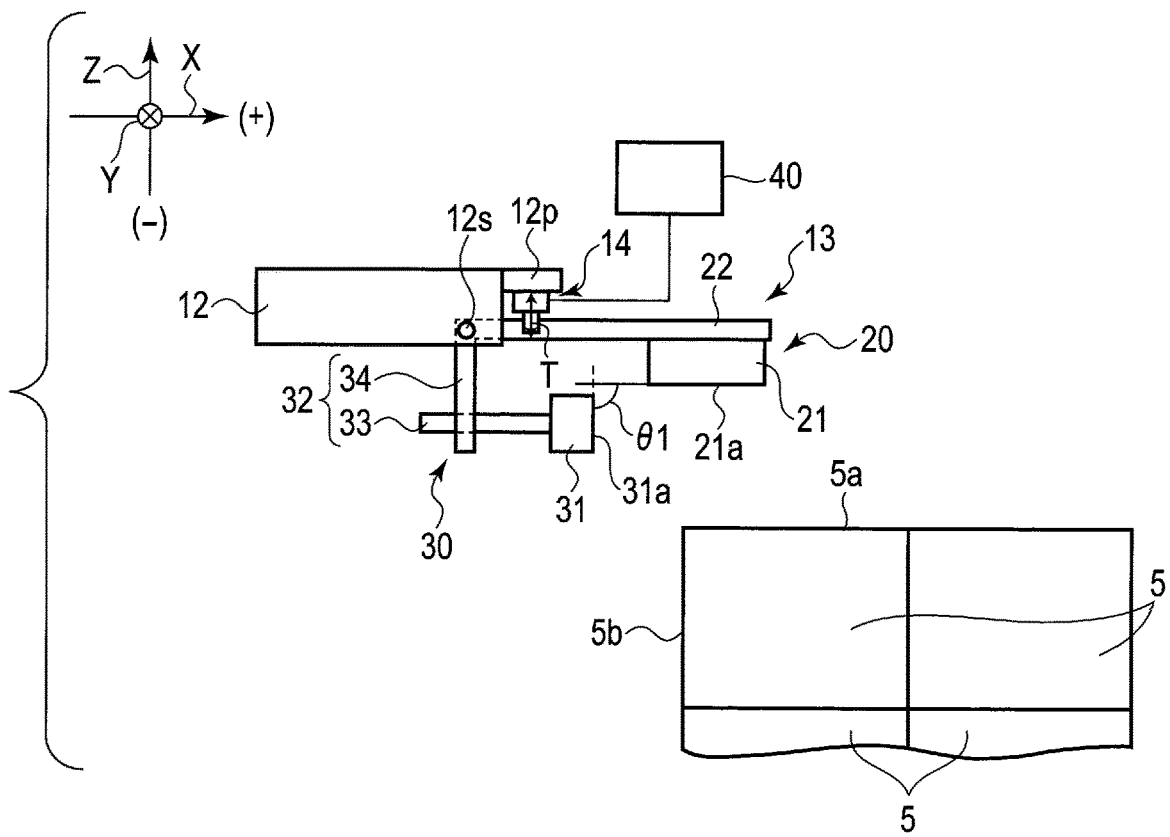
FIG. 2 is a side view showing an arm, a grip mechanism and a hold mechanism of the transfer apparatus along with a package.

Next, the arm 12, the grip mechanism 13, a hold mechanism 14 and a control unit 40 of the transfer apparatus 1 will be described. The transfer apparatus 1 further includes the hold mechanism 14. FIG. 2 is a side view showing the arm 12, the grip mechanism 13, the hold mechanism 14 and the control unit 40 of the transfer apparatus 1 along with the packages 5.

As shown in FIG. 2, the arm 12 has a rotation fulcrum portion 12s. The grip mechanism 13 is connected to the rotation fulcrum portion 12s and is turnable around the rotation fulcrum portion 12s. The grip mechanism 13 includes a first grip portion 20 and a second grip portion 30. The first grip portion 20 grips a first surface 5a of the package 5. The second grip portion 30 maintains an angle θ1 with the first grip portion 20, and grips a second surface 5b crossing the first surface 5a of the package 5. In the present embodiment, the first surface 5a is the upper surface of the package 5, and the second surface 5b is a side surface facing the transfer apparatus 1 of the side surfaces of the package 5.

The first grip portion 20 includes a first pad 21 and a first support member 22 supporting the first pad 21. The first pad 21 includes a first grip surface 21a which grips the first surface 5a.

The second grip portion 30 includes a second pad 31 and a second support member 32. The second pad 31 includes a second grip surface 31a which grips the second surface 5b. The second support member 32 supports the second pad 31, moves the second pad 31 in a direction orthogonal to the second grip surface 31a, and is connected to the rotation fulcrum portion 12s together with the first support member 22. Note that the direction in which the second support member 32 moves the second pad 31 is not limited to the direction orthogonal to the second grip surface 31a but may be any direction crossing the second grip surface 31a.

Here, the angle θ1 is an angle between the first grip surface 21a and the second grip surface 31a.

The second supporting member 32 includes a first member 33 and a second member 34. The first member 33 supports the second pad 31, and moves the second pad 31 in the direction orthogonal to the second grip surface 31a. Note that the direction in which the first member 33 moves the second pad 31 is not limited to the direction orthogonal to the second grip surface 31a but may be any direction crossing the second grip surface 31a. The second member 34 movably supports the first member 33 and is connected to the rotation fulcrum portion 12s together with the first support member 22. For example, the first support member 22 and the second member 34 are integrally formed.

In the present embodiment, the first pad 21 is a suction pad which sucks the first surface 5a, and the second pad 31 is a suction pad which sucks the second surface 5b.

In a state where the grip mechanism 13 is held in a standby position as shown in the drawing, the first grip surface 21a is parallel to an X-Y plane and faces the negative (−) side of the Z axis. Here, the first grip surface 21a is parallel to the first surface 5a of the package 5. The second grip surface 31a is parallel to a Y-Z plane and faces the positive (+) side of the X axis. The first member 33 moves the second pad 31 along the X axis. The angle θ1 is 90°.

The configuration of the grip mechanism 13 is presented by way of example only, and is not limited to the configuration of the present embodiment but may be variously modified.

The hold mechanism 14 holds the grip mechanism 13 in the standby position and turns the grip mechanism 13. In the present embodiment, the hold mechanism 14 is connected to the arm 12 and the grip mechanism 13. The hold mechanism 14 exerts an attractive force T on the grip mechanism 13. In the present embodiment, the hold mechanism 14 is connected to the first grip portion 20 of the grip mechanism 13 and exerts the attractive force T on the first grip portion 20. Consequently, the relative positional relationship between the arm 12 and the grip mechanism 13 can be maintained. In addition, when the grip mechanism 13 lifts the gripped package 5, the hold mechanism 14 can hold the grip mechanism 13 in the standby position and turn the grip mechanism 13.

In the state illustrated, the hold mechanism 14 extends along the Z axis. The hold mechanism 14 is connected to a projection portion 12p facing the first support member 22 of the arm 12. Note that the first support member 22 is located between the projection portion 12p and the first member 33. By exerting the attractive force T which pulls the grip mechanism 13 toward the projection portion 12p on the grip mechanism 13, the hold mechanism 14 can maintain the relative positional relationship between the arm 12 and the grip mechanism 13, in other words, the hold mechanism 14 can maintain the grip mechanism 13 in a non-turning state.

Examples of the hold mechanism 14 are actuators such as an air cylinder and a motor, an elastic body such as a spring, and a mechanism using air pressure.

For example, if the hold mechanism 14 is an air cylinder, the hold mechanism 14 can exert a repulsive force which pushes the grip mechanism 13 away from the projection portion 12p on the grip mechanism 13. Therefore, even in a state where the grip mechanism 13 is not gripping the package 5, the hold mechanism 14 can turn the grip mechanism 13.

Next, a method of turning the grip mechanism 13 will be described. As the method of turning the grip mechanism 13, there are an active method of turning the grip mechanism 13 using an actuator and a passive method of naturally turning the grip mechanism 13 using the weight of the package 5.

(Active Method)

If the hold mechanism 14 is an actuator such as an air cylinder, the hold mechanism 14 can actively turn the grip mechanism 13. The active method has the following characteristics. That is, the active method can select whether or not to turn the grip mechanism 13 according to the weight of the package 5 or the arrangement of the package 5.

In the present embodiment, the hold mechanism 14 is an air cylinder.

Since the hold mechanism 14 is an actuator as described above, the transfer apparatus 1 further includes the control unit 40 which controls the drive of the hold mechanism 14.

The control unit 40 executes first drive and second drive of the hold mechanism 14. According to the first drive by the control unit 40, the hold mechanism 14 maintains the relative positional relationship between the arm 12 and the grip mechanism 13. The grip mechanism 13 is supported on the rotation fulcrum portion 12s such that the grip mechanism 13 is turnable between the standby position and an inclined position which is inclined with respect the standby position. Therefore, according to the first drive, the hold mechanism 14 can hold the grip mechanism 13 in the standby position, and the hold mechanism 14 can hold the grip mechanism 13 in the inclined position different from the standby position and maintain the package 5 in a state of being tilted with respect to a mounting surface. Here, the mounting surface means a surface on which the package 5 is mounted.

In addition, according to the second drive by the control unit 40, the hold mechanism 14 turns the grip mechanism 13. Therefore, according to the second drive, the hold mechanism 14 can turn the grip mechanism 13 from the standby position to the inclined position, and the hold mechanism 14 can turn the grip mechanism 13 and return the grip mechanism 13 to the standby position.

For example, in a case where the hold mechanism 14 is an air cylinder, the control unit 40 sucks air from the air cylinder as the second drive and changes the direction of the force exerted on the first grip portion 20. Consequently, the control unit 40 can turn the grip mechanism 13 at an intended timing and tilt the package 5 with respect to the mounting surface. Note that the timing for turning the grip mechanism 13 may be the same as the timing for lifting the package 5 or may be after the timing for lifting the package 5.

In addition, the hold mechanism 14 is configured not to turn the grip mechanism 13 toward the projection portion 12p from the standby position. Alternatively, although not shown in the drawing, the transfer apparatus 1 includes a stopper which stops the grip mechanism 13 from turning toward the projection portion 12p from the standby position. Therefore, in the state shown in FIG. 2, the grip mechanism 13 will not turn counterclockwise from the standby position around the rotation fulcrum portion 12s. Therefore, when the grip mechanism 13 is returned to the standby position, even if the grip mechanism 13 is turned counterclockwise around the rotation fulcrum portion 12s, the grip mechanism 13 can be stopped in the standby position.

(Passive Method)

In a case where the hold mechanism 14 is a spring, the hold mechanism 14 can passively turn the grip mechanism 13. The passive method has the following characteristics. That is, the passive method does not require an actuator to be controlled. Since the hold mechanism 14 is not an actuator as described above, the transfer apparatus 1 is constituted without the control unit 40. In addition, since an angle at which the grip mechanism 13 turns changes depending on the weight of the package 5, the passive method also has the following characteristics. That is, the turning angle can be used for detecting the weight of the package 5. For example, it is possible to change a speed at which the arm 12 is moved to the positive (+) side of the Z axis on the basis of the detected weight.

In the passive method also, the hold mechanism 14 is configured not to turn the grip mechanism 13 toward the projection portion 12p from the standby position. Alternatively, although not shown in the drawing, the transfer apparatus 1 includes the stopper.

From the above, in a state where the grip mechanism 13 does not grip the package 5, the hold mechanism 14 can hold the grip mechanism 13 in the standby position without turning the grip mechanism 13. In a state where the grip mechanism 13 grips the package 5 and the arm 12 linearly moves to the positive (+) side of the Z axis, the grip mechanism 13 cannot be held in the standby position by the attractive force T of the hold mechanism 14, and consequently, the grip mechanism 13 turns from the standby position, and the grip mechanism 13 and the hold mechanism 14 maintain the package 5 in a state of being tilted with respect to the mounting surface.

Figure 3:
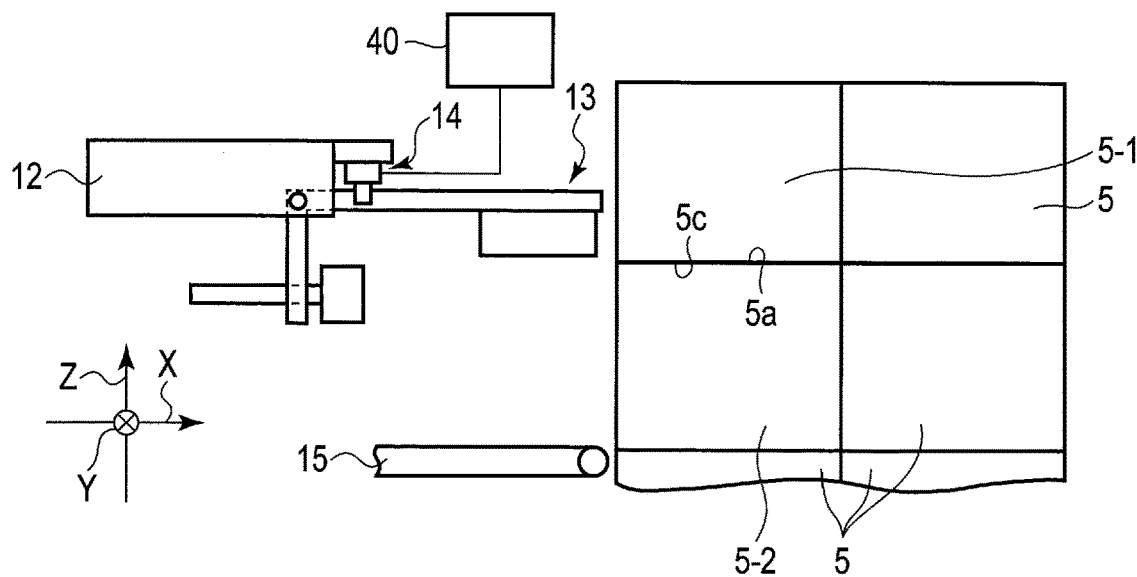
FIG. 3 is an illustration for explaining a transfer method using the transfer apparatus, and is an illustration showing a state where the position of a package with respect to the transfer apparatus is fixed.

Next, a transfer method using the transfer apparatus 1 will be described. Here, the case of transferring the package 5 loaded in the roll-box-pallet 2 to the transport table 3 will be described as an example. FIG. 3 is an illustration for explaining the transfer method using the transfer apparatus 1, and is an illustration showing a state where the position of the package 5 with respect to the transfer apparatus 1 is fixed.

As shown in FIGS. 3 and 1, when the transfer of the package 5 is started, firstly, the position of the roll-box-pallet 2 with respect to the transfer apparatus 1 is fixed using the support bar 19. In this state, the position of the movement conveyor 15 does not match the position of a third surface 5c of a package 5-1 on the Z axis. Here, the package 5-1 is a package at the uppermost level and is loaded on a package 5-2. The third surface 5c is the lower surface of the package 5. Alternatively, the position of the movement conveyor 15 does not match the position of the first surface 5a of the package 5-2. Then, the second movement mechanism 16 is driven, and the movement conveyor 15 is moved along the Z axis.

Figure 4:
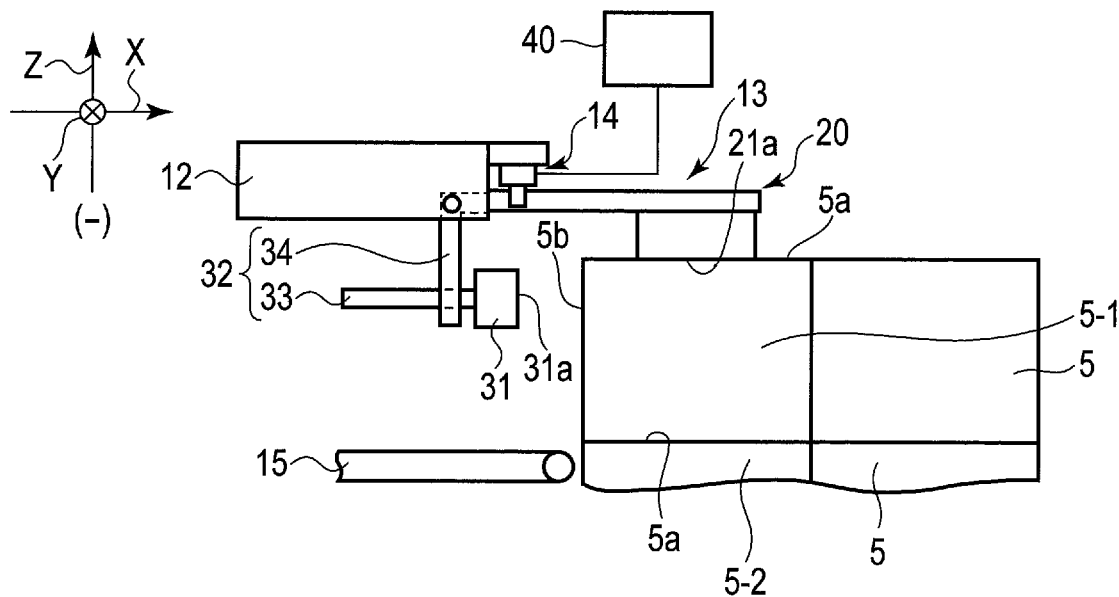
FIG. 4 is an illustration for explaining the transfer method following FIG. 3, and is an illustration showing a state where the height of a movement conveyor of the transfer apparatus is adjusted to the height of a first surface of a package at the second level from the top of packages loaded in the roll-box-pallet and a first grip portion grips a first surface of a package at the uppermost level.

FIG. 4 is an illustration for explaining the transfer method following FIG. 3, and is an illustration showing a state where the height of the movement conveyor 15 of the transfer apparatus 1 is adjusted to the height of the first surface 5a of the package 5-2 of the packages 5 loaded in the roll-box-pallet 2 and the first grip portion 20 grips the first surface 5a of the package 5-1 located at the uppermost level and located on the negative (-) side of the X axis most.

Consequently, the height of the movement conveyor 15 can be adjusted to the height of the first surface 5a of the package 5-2 as shown in FIG. 4.

In addition, before the second movement mechanism 16 is driven, when the drive of the second movement mechanism 16 is driven or after the second movement mechanism 16 is driven, the first movement mechanism 11 and the arm 12 are driven and the grip mechanism 13 is moved. When the grip mechanism 13 is moved, the first grip surface 21a is moved and placed above the first surface 5a of the package 5-1. At this time, the first grip surface 21a should preferably face the center of the first surface 5a in a direction along the Z axis. If the position of the center of gravity of the package 5 is known in advance, the first grip surface 21a should preferably face the center of gravity of the package 5 in the direction of gravity.

Subsequently, the first linear movement portion 11a is driven, the grip mechanism 13 is moved to the negative (-) side of the Z axis, the first grip surface 21a is brought into contact with the first surface 5a of the package 5-1, and the first surface 5a is gripped by the first grip portion 20. In this state, the second grip surface 31a is separated from the package 5-1.

Next, the first member 33 moves the second pad 31 and brings the second pad 31 closer to the second surface 5b of the package 5-1.

Figure 5:
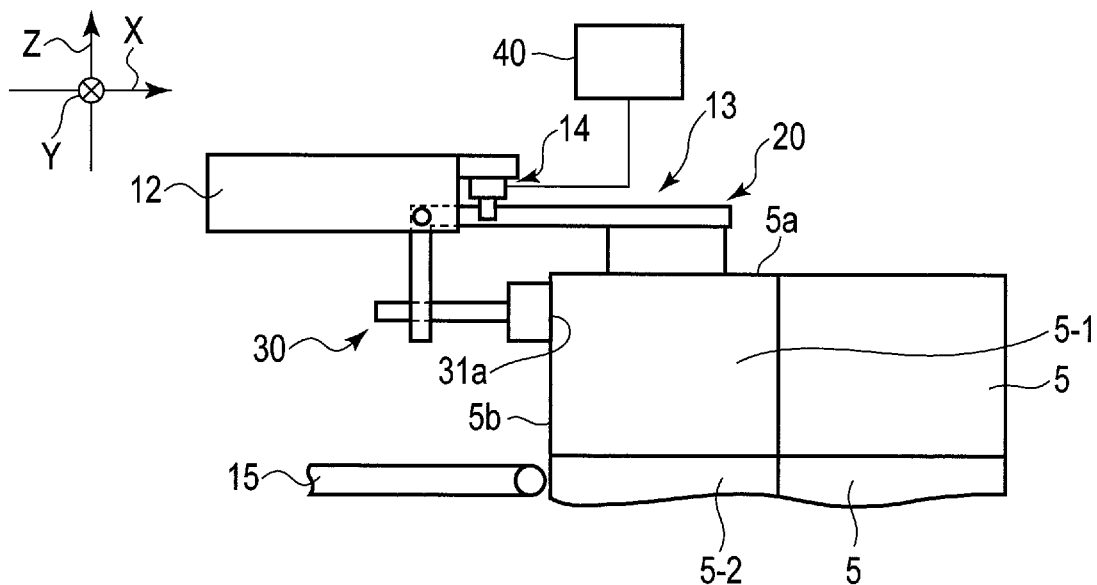
FIG. 5 is an illustration for explaining the transfer method following FIG. 4, and is an illustration showing a state where a second grip portion further grips a second surface of the package.

FIG. 5 is an illustration for explaining the transfer method following FIG. 4, and is an illustration showing a state where the second grip portion 30 further grips the second surface 5b of the package 5-1.

As shown in FIG. 5, the second grip surface 31a is brought into contact with the second surface 5b of the package 5-1, and the second surface 5b is gripped by the second grip portion 30. Consequently, the grip mechanism 13 can grip the package 5-1 from two directions of the first surface 5a and the second surface 5b.

Figure 6:
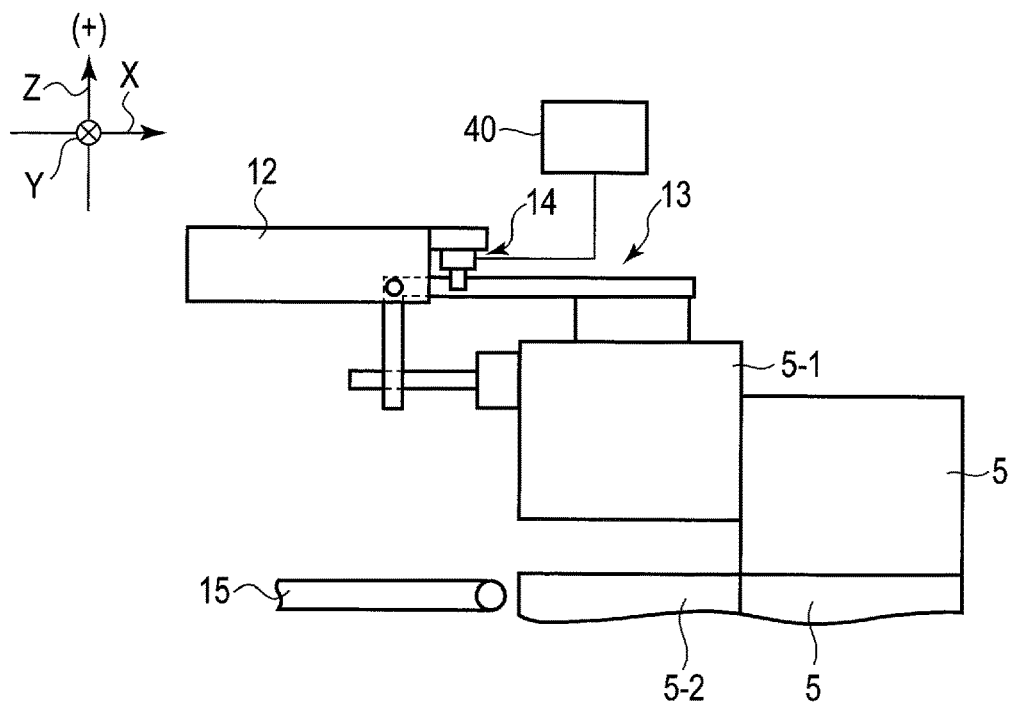
FIG. 6 is an illustration for explaining the transfer method following FIG. 5, and is an illustration showing a state where the package is lifted without being tilted and the package is floated from a package at the lower level.

FIG. 6 is an illustration for explaining the transfer method following FIG. 5, and is an illustration showing a state where the package 5-1 is lifted without being tilted and the package 5-1 is floated from the package 5-2.

After that, as shown in FIG. 6, the first linear movement portion 11a is driven, the grip mechanism 13 is moved to the positive (+) side of the Z axis, the package 5-1 is lifted without being tilted, and the package 5-1 is floated from the package 5-2. Subsequently, the first movement mechanism 11 and the arm 12 are driven, and the package 5 is moved and placed on the movement conveyor 15 while being maintained in a horizontal state. As described above, when the package 5-1 gripped by the grip mechanism 13 is lifted and moved by the first movement mechanism 11 and the arm 12, in the illustrated state, the hold mechanism 14 holds the grip mechanism 13 in the standby position. In a case where the package 5-1 cannot be dragged to the vicinity of the movement conveyor 15, it is possible to move the package 5-1 by lifting the package 5-1.

When the lifted package 5-1 is moved and placed on the movement conveyor 15, the package 5-1 may be moved in a tilted state. In this case, the hold mechanism 14 turns the grip mechanism 13 from the standby position and maintains the package 5 in a tilted state. More specifically, after the control unit 40 executes the second drive of the hold mechanism 14 and tilts the package 5, the control unit 40 executes the first drive of the hold mechanism 14 and maintains the package 5 in a tilted state.

Figure 7:
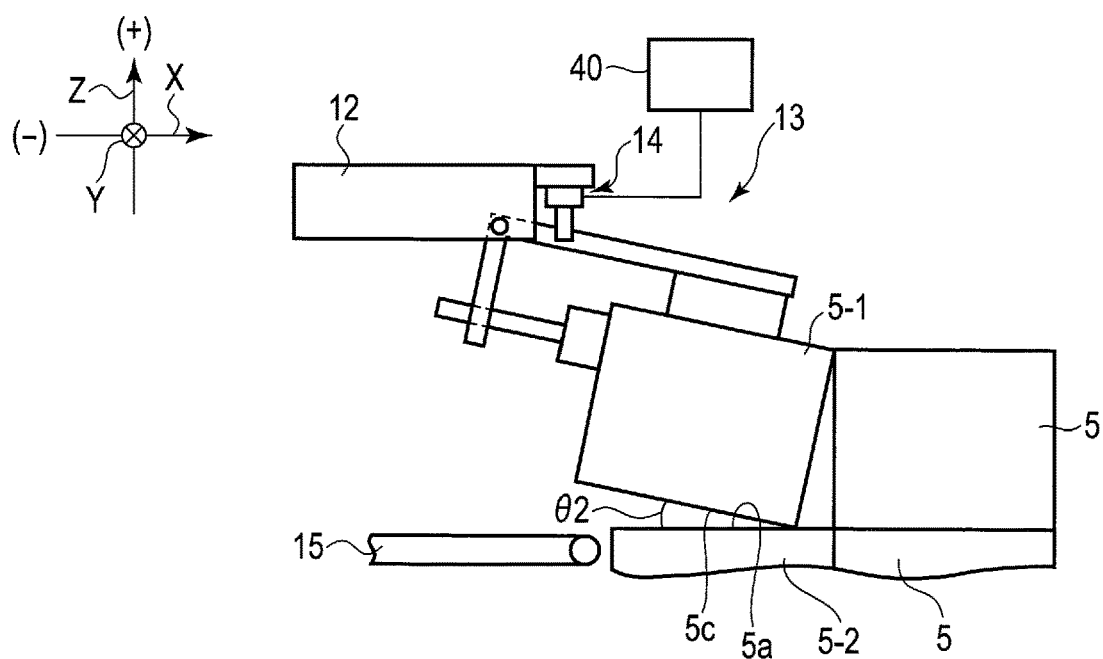
FIG. 7 is an illustration for explaining the transfer method different from that of FIG. 6, following FIG. 5, and is an illustration showing a state where the package is lifted, the package is tilted, and part of a third surface of the package is in contact with a package at the lower level.

FIG. 7 is an illustration for explaining the transfer method different from that of FIG. 6, following FIG. 5, and is an illustration showing a state where the package 5-1 is lifted, the package 5-1 is tilted, and part of the third surface 5c of the package 5-1 is in contact with the first surface 5a of the package 5-2.

Following FIG. 5, the first linear movement portion 11a is driven, the grip mechanism 13 is moved to the positive (+) side of the Z axis, the package 5-1 is tilted with respect to the first surface 5a of the package 5-2 (the mounting surface), and part of the third surface 5c of the package 5-1 is in contact with the first surface 5a of the package 5-2 as shown in FIG. 7. An angle θ2 at which the package 5-1 is tilted is not limited in particular. For example, the angle θ2 is less than or equal to 20°. Next, the arm 12 is driven, and the grip mechanism 13 is moved to the negative (−) side of the X axis.

FIG. 8 is an illustration for explaining the transfer method following FIG. 7 and is an illustration showing a state where the package 5-1 is dragged to the vicinity of the movement conveyor 15.

As shown in FIG. 8, by driving the arm 12, it is possible to drag the package 5-1 to the vicinity of the movement conveyor 15 while maintaining the package 5-1 in a tilted state. After the package 5-1 is dragged until part of the third surface 5c of the package 5-1 faces the movement conveyor 15 in a direction along the Z axis, the package 5-1 is released from a state of being gripped by the grip mechanism 13. At this time, the first linear movement portion 11a may be driven, and the grip mechanism 13 may be moved to the positive (+) side of the Z axis. In this way, it is possible to avoid a situation where the package 5-1 clashes with the grip mechanism 13 and the movement of the package 5-1 is blocked.

FIG. 9 is an illustration for explaining the transfer method following FIG. 6 or FIG. 8, and is an illustration showing a state where the package 5-1 is moved and placed on the movement conveyor 15.

As shown in FIG. 9, the package 5-1 can be moved and placed on the movement conveyor 15, and consequently the package 5-1 can be moved to the transport table 3. The movement conveyor 15 may be driven after the third surface 5c of the package 5-1 is brought into contact with the movement conveyor 15, or the movement conveyor 15 may be driven before the third surface 5c of the package 5-1 is brought into contact with the movement conveyor 15. Then, the transfer of the package 5-1 ends.

Figure 10:
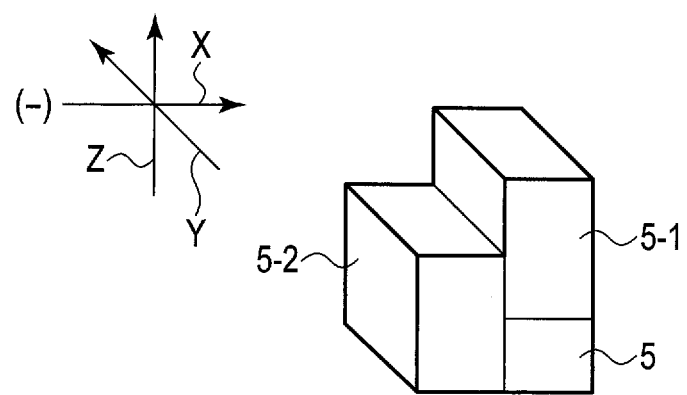
FIG. 10 is a perspective view showing a plurality of packages, and is an illustration showing a state where a plurality of packages are irregularly loaded.

Next, a method of transferring irregularly-loaded packages will be described. FIG. 10 is a perspective view showing a plurality of packages 5, and is an illustration showing a state where a plurality of packages are irregularly loaded.

As shown in FIG. 10, when a plurality of loaded packages 5 are transferred, the packages 5 are transferred one by one from above (from the package 5 located in the highest position). If there are a plurality of packages 5 in the highest position, the packages 5 are transferred one by one from the package 5 on the negative (−) side of the X axis (the package 5 on the transfer apparatus 1 side). In FIG. 10, the package 5-1 is a package located in the highest position, and the package 5-2 is located on the negative (−) side of the X axis from the package 5-1.

Incidentally, in a case where the packages 5 are irregularly loaded, the height of each package 5 is not known. Therefore, in order to transfer the package 5-1, it is necessary to lift the package 5-1 under the assumption that the height of the package 5-1 is the maximum height of package specifications. For this reason, in a case where the packages are irregularly loaded, the packages 5 are lifted and transferred such that the packages 5 such as the package 5-1 will not be tilted or the packages 5 will not be dragged. For example, if the package 5-1 is tilted, the package 5-2 on the front side is knocked down, and the packages may collapse.

Figure 11:
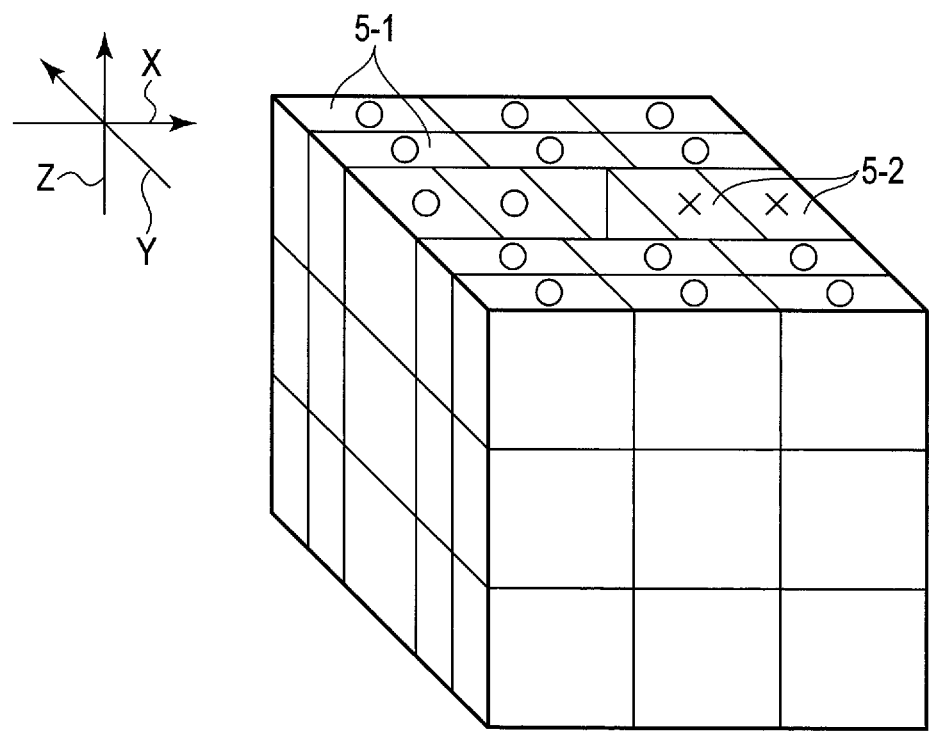
FIG. 11 is another perspective view showing a plurality of packages, and an illustration showing a state where a plurality of packages are loaded according to a rule.

Next, a method of transferring packages loaded according to a rule will be described. FIG. 11 is another perspective view showing a plurality of packages 5, and is an illustration showing a state where a plurality of packages 5 are loaded according to a rule.

As shown in FIG. 11, a plurality of packages 5 are loaded in the same manner at three levels. In a case where the packages 5 are loaded according to a rule, the heights of the packages 5 are constant. Therefore, when the package 5 is lifted, even if the package 5 is tilted, there is no package that could fall down to the front side.

There is no level difference among the upper surfaces of the packages 5, but depending on how the packages 5 are loaded, a space at the center shown in the drawing may be formed. In this case, with regard to the package 5-1 which is adjacent to the transfer apparatus 1 (movement conveyor 15), there is no level difference on the front side (negative (−) side of the X axis). Therefore, the package 5-1 can be dragged on the upper surface of the lower-level package 5-1 and moved to the movement conveyor 15.

On the other hand, in the case of moving the package 5-2 across a level difference on the front side (in the case of moving a package via a space), it is impossible to drag the package 5-2. Therefore, the package 5-2 is lifted and moved. At that time, the package 5-2 can be tilted. Note that the packages 5-1 of the packages 5 at the uppermost level are denoted by ○ and the packages 5-2 of the packages 5 at the uppermost level are denoted by X in the drawing.

According to one embodiment having the above-described configuration, the transfer apparatus 1 includes the arm 12 including the rotation fulcrum portion 12s, and the grip mechanism 13 which is connected to the rotation fulcrum portion and is turnable around the rotation fulcrum portion. If the package 5 is a packed cardboard box, the first surface 5a does not have sufficient strength. Therefore, if the first surface 5a of the package 5 is gripped and the second surface 5b of the package 5 is not gripped, the package (cardboard box) 5 becomes more likely to be broken while the package 5 is being lifted as the weight of the package 5 increases. Since the package 5 is lifted in a direction in which the package (cardboard box) 5 opens, the package 5 closed with an adhesive, etc., will open.

Therefore, the grip mechanism 13 includes the first grip portion 20 which grips the first surface 5a, and the second grip portion 30 which grips the second surface 5b in a state of maintaining the angle θ1. The grip mechanism 13 can grip the package 5 from two directions. Consequently, it is possible to transfer the package 5 without breaking the package 5. It is also possible to transfer the package 5 without dropping the package 5.

Furthermore, in the present embodiment, the grip mechanism 13 is turnable and can tilt the package 5. When the package 5 is lifted, as the package 5 is tilted, not only a direction in which the first pad 21 grips the first surface 5a (suction direction) but also a direction in which the second pad 31 grips the second surface 5b (suction direction) become not perpendicular to the direction of gravity, and as a result, the package 5 can be stably gripped. In addition, since the grip mechanism 13 pulls the corner of the package 5, it is possible to transfer the package 5 more reliably without breaking the package 5.

Furthermore, generation of a moment due to positional deviation of the pads (first pad 21 and second pad 31) from the center of gravity of the package 5 in the direction along the X axis is suppressed. Therefore, detachment of the pads from the package 5 can be further suppressed.

When the package 5-1 is dragged, as the package 5-1 is tilted, the contact area of the third surface 5c of the package 5-1 with the first surface 5a of the package 5-2, etc., can be reduced. As compared to a case where the package 5-1 is not tilted, frictional resistance generated on the third surface 5c can be reduced, and the package 5-1 can be smoothly dragged. Furthermore, as compared to a case where the package 5-1 is floated, forces exerted on the pads can be reduced, and detachment of the pads from the package 5-1 can be further suppressed.

Whatever the shape of the first surface 5a and the second surface 5b may be and whatever the material of the first surface 5a and the second surface 5b may be, it is possible to transfer the package 5 more reliably without breaking the package 5.

In the second grip portion 30, the second pad 31 is movable in the direction orthogonal to the second grip surface 31a. However, the moving direction of the second pad 31 is not limited to the direction orthogonal to the second grip surface 31a but may be any direction crossing the second grip surface 31a. Therefore, after the first surface 5a is gripped by the first pad 21, the second surface 5b can be gripped by the second pad 31. In addition, the packages 5 of different sizes and shapes can be stably gripped by the grip mechanism 13.

From the above, the transfer apparatus 1 which can stably transfer the package 5 can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the above-described embodiment is not limited to the transfer apparatus 1 but is applicable to various transfer apparatuses.

What is claimed is:

1. A transfer method using a transfer apparatus,
the transfer apparatus comprising:
   an arm including a rotation fulcrum portion; and
   first and second grip portions connected to the rotation fulcrum portion and turnable around the rotation fulcrum portion,
the transfer method comprising:
   gripping a first surface of a grip target object mounted on a mounting surface by the first grip portion;
   gripping a second surface crossing the first surface of the grip target object by the second grip portion;
   lifting the arm together with the first and second grip portions, to lift the grip target object;
   (1) turning the first and second grip portions, to tilt the grip target object with respect to the mounting surface and bring the grip target object into contact with the mounting surface;
   subsequently to (1), (2) maintaining the grip target object in a state of being tilted with respect to the mounting surface and in contact with the mounting surface; and
   subsequently to (2), (3) moving the arm together with the first and second grip portions, to drag the grip target object in contact with the mounting surface to a movement conveyor along the mounting surface in the state of being tilted.

2. The transfer method of claim 1, wherein when the grip target object is lifted, the first and second grip portions are naturally turned according to a weight of the grip target object, to tilt the grip target object with respect to the mounting surface.

* * * * *